(12) United States Patent
Taylor, Jr.

(10) Patent No.: US 6,860,989 B2
(45) Date of Patent: Mar. 1, 2005

(54) MAKE-UP WATER RE-CIRCULATION IN SLURRY PROCESSING UNIT

(75) Inventor: Ancil S. Taylor, Jr., New Orleans, LA (US)

(73) Assignee: C. F. Bean L.L.C., New Orleans, LA (US)

( * ) Notice: Subject to any disclaimer, the term of this patent is extended or adjusted under 35 U.S.C. 154(b) by 0 days.

(21) Appl. No.: 09/885,767

(22) Filed: Jun. 20, 2001

(65) Prior Publication Data

US 2002/0195400 A1 Dec. 26, 2002

(51) Int. Cl.$^7$ .................................................. E02F 3/88
(52) U.S. Cl. ...................... 210/97; 210/167; 210/170; 210/195.1; 210/242.1; 210/258; 406/94; 406/106
(58) Field of Search ........................... 406/93, 94, 106, 406/198; 137/563; 210/242.1, 167, 170, 194, 195.1, 258, 97

(56) References Cited

U.S. PATENT DOCUMENTS

| | | | |
|---|---|---|---|
| 4,327,759 A | 5/1982 | Millis | |
| 4,416,567 A | * 11/1983 | Elmore et al. ................. | 406/63 |
| 4,436,431 A | 3/1984 | Strong et al. | |
| 4,490,044 A | 12/1984 | Saito et al. | |
| 4,746,290 A | 5/1988 | DeCicco et al. | |
| 4,747,728 A | 5/1988 | Norris et al. | |
| 4,766,822 A | 8/1988 | De Cicco et al. | |
| 4,854,058 A | * 8/1989 | Sloan et al. ................. | 210/170 |
| 4,925,389 A | 5/1990 | DeCicco et al. | |
| 4,961,391 A | 10/1990 | Mak et al. | |
| 5,027,267 A | 6/1991 | Pitts et al. | |
| 5,269,635 A | 12/1993 | Taylor, Jr. | |
| 2002/0113017 A1 | * 8/2002 | Sheets ........................ | 210/660 |

FOREIGN PATENT DOCUMENTS

| | | | | |
|---|---|---|---|---|
| JP | 56059931 A | * | 5/1981 | ............. E02F/3/88 |
| JP | 62225629 A | * | 10/1987 | |

\* cited by examiner

*Primary Examiner*—Terry K. Cecil
(74) *Attorney, Agent, or Firm*—Dennis T. Griggs

(57) ABSTRACT

Make-up water derived from an on-shore treatment facility is returned to a slurry processing unit on board a dredge by means of a water supply pipeline floating alongside a slurry delivery pipeline that conveys dredged material to the on-shore treatment facility. After separation from the slurry solids, the return water is pressurized to a transport pressure at the treatment facility with a centrifugal pump and then boosted to the desired working pressure once aboard the dredge. This two-stage pumping and re-cycling process reduces the amount of clear make-up water needed for proper operation of the slurry processing unit by more than 50%. This has resulted in a substantial reduction in the overall cost of remediation by reducing the amount of water that must be cleaned prior to disposal.

4 Claims, 3 Drawing Sheets

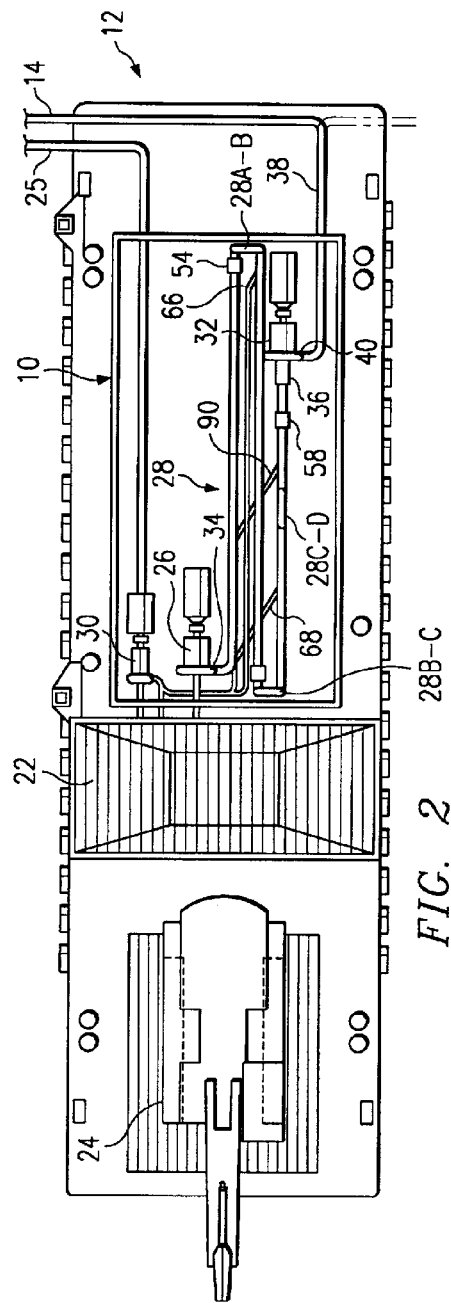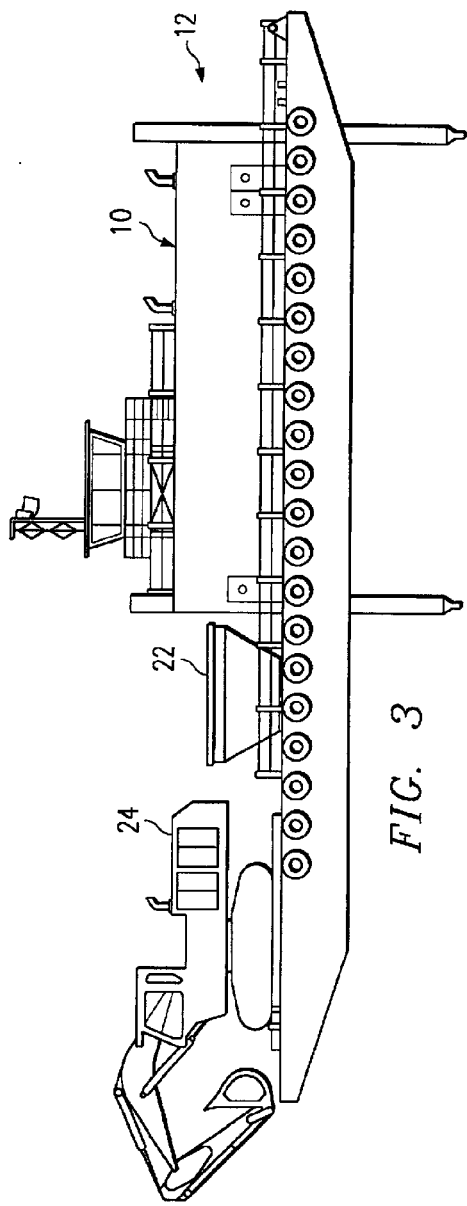
FIG. 2
FIG. 3

MAKE-UP WATER RE-CIRCULATION IN SLURRY PROCESSING UNIT

BACKGROUND OF THE INVENTION

This invention relates generally to systems for processing waste materials, and more particularly to a system for treating sludge dredged from a waterway with an appropriate amount of water to be pumped in slurry form through a floating pipeline.

Much effort has been directed to cleaning up toxic wastes in a drive to restore our natural environment. Some of such toxic waste is in the form of sediment or sludge that lies at the bottom of waterways. These sediments tend to concentrate heavy-metal toxins, halogenated hydrocarbons, pesticides and anaerobic bacteria. Periodically, the sludge is removed by dredging and then transported, either by barge or pumped in slurry form through a floating pipeline, to an upland shore facility for disposal.

Conventional dredging processes generally include three operations: digging, transportation and disposal of the sludge. These processes employ either suction (e.g. hopper or cutter-head) or mechanical (e.g. dipper, ladder or clam shell) digging techniques. The dredgers alone, or with the aid of barges, floating pipelines and conveyors, are able to transport the dredged material to an on-shore site.

In the case of upland disposal, the sludge may be transported via a floating pipeline as a watery pulp or slurry. The concentration of sludge solids is very low; the ratio by weight between the sludge and water is from about 1/7 to about 1/15, or one part of sludge solids to every 7 to 15 parts of water. At the disposal site, the sludge solids are separated from the water and the water is returned to the waterway as an effluent. Because some contaminated sludge remains in the returned water, pollution of the water environment is very likely.

The Hazardous and Solid Waste Amendments (HSWA) to the Resource Conservation and Recovery Act (RCRA), United States Public Law P.L. 98–616 and regulations written by the United States Environmental Protection Agency (EPA) include specific provisions restricting the direct land disposal of many hazardous wastes, including contaminated sludge and waste water. These restrictions, commonly referred to as the "Land Ban," require that many types of waste including sludge and waste water be treated prior to land disposal to reduce the toxicity of the hazardous components.

The composition of such sludge is, of course, highly variable. When the sludge is transported via a floating pipeline, a large amount of make-up water must be added to produce a slurry with appropriate pumping characteristics. This make-up water is taken from the surrounding waterway and is further contaminated by treatment chemicals during decontamination and separation of sludge solids at an on-shore treatment facility. The decontamination facility may use chemical agents such as chlorine or sulphur dioxide, chemical coagulants and electrochemical flocculation techniques in various combinations to accomplish sludge decontamination. The process water generated by such chemical treatment must be further treated and made environmentally safe before land disposal or return to the waterway.

A slurry processing unit (SPU) as described in U.S. Pat. No. 5,269,635 was designed to deliver an optimum slurry characteristic to the deposition point of a confined disposal facility (CDF) and reduce the total amount of make-up water added to the slurry to the minimum while still maintaining a practical and feasible transportable mixture.

Reduction of make-up water added during the transportation phase was originally accomplished by managing the injection of make-up water received from the surrounding water body with an onboard monitoring and control computer. While this optimizes the relationship between the slurry's geotechnical characteristics, including its viscous properties, it still requires a substantial volume of clear make-up water that must eventually be filtered or treated chemically prior to its release back into the waterway.

BRIEF SUMMARY OF THE INVENTION

According to the present invention, make-up water for input to a slurry processing unit is supplied by re-circulating process treatment water separated from slurry treated at an on-shore (upland) confined disposal facility (CDF) back to a slurry processing unit (SPU) located on a dredging barge at a dredging site.

The slurry processing unit receives process treatment water returned directly from the on-shore CDF via a floating pipeline. The process water at the CDF is captured and pressurized to a level that will transport it back to the SPU on the dredge at an appropriate flow rate that is required by the SPU controller. The pressure of the make-up water pump located at the CDF for initial pressurization is kept at a minimum to reduce the risk of pipeline failure between the CDF and the dredge.

Once the return process water reaches the dredge, it is boosted to the level necessary to accommodate the make-up water needs of the SPU. The SPU utilizes the re-cycled process water as needed for transportation of the contaminated sludge sediments in a pumpable slurry to the on-shore CDF. The process water is circulated in a closed loop from the treatment facility to the dredge until the dredging of sediments is complete.

An essential step in the process of the present invention involves the re-circulation of the process water from the confined disposal facility (CDF) back to the slurry processing unit (SPU). In the operation of conventional systems, the make-up water used in the injection system for cutting the density and viscosity to the desired parameters was supplied by clear water pumped from the surrounding waterway into the dredge's sea chest in the barge. While the present invention optionally allows some make-up water to be sourced from overboard, the ability to re-cycle process water from the on-shore disposal facility to meet the make-up water needs of the SPU provides an improved solids-to-water ratio by avoiding the introduction of any new clear water from overboard during the slurry preparation phase.

Process treatment water is returned from the on-shore disposal facility to be used as make-up water on the dredge by a supply pipeline that is floated alongside the slurry delivery pipeline that transports slurry from the dredge to the disposal facility. The process treatment water is pressurized by a centrifugal pump located at the at the CDF and then boosted by a high pressure pump to the desired working pressure once aboard the dredge. Some of the process water is discharged as needed directly into the dredge hopper for initial sludge dilution and some of it is injected as make-up water into the slurry at one or more specific gravity measurement stations on board the dredge.

Such pump control together with multiple specific gravity measurements and make-up water injection between measurement stations provides an accurate indication of the amount of make-up water to be injected, even though the sludge solids are of varying composition. Inlet slurry flow, inlet make-up water flow, the slurry discharge flow, the make-up water pressure and the pressure in the slurry delivery pipeline can all be controlled using a primary fixed speed inlet pump, a booster pump for the make-up (process treatment) water and a variable speed discharge pump together with throttling valves in the make-up water injection pipes. This minimizes cost and avoids maintenance problems that would be caused by throttling valves in the slurry piping.

In the preferred embodiment, the slurry processing unit includes an inlet make-up water booster pump and an inlet slurry pump, with the inlet slurry pump being operated at a constant pumping rate, and with flow of the inlet slurry pump not being throttled; inlet water piping connecting the make-up water pipeline to the dredge hopper and to the inlet of the booster pump; a speed-controlled slurry discharge pump; slurry piping connecting the output of the inlet slurry pump to the input of the discharge pump; discharge piping connected between an outlet of the discharge pump and the floating pipeline; make-up water piping having an input connected to the output of the inlet make-up water pump, and having a make-up water injection pipe connected to an intermediate point of the slurry piping.

Generally, the invention is a closed loop slurry processing system for pumping varying compositions of slurry via a floating delivery pipeline to an on-shore treatment facility, a floating return pipeline connecting the on-shore treatment facility for supplying process treatment water as make-up water to the input of a slurry processing unit including an inlet make-up water booster pump and an inlet slurry pump; a discharge pump; slurry piping connecting the output of the inlet slurry pump to the input of the discharge pump; discharge piping connected between an outlet of the discharge pump and the floating slurry pipeline; and a low pressure pump coupled between the on-shore treatment facility and the return pipeline for supplying process treatment water that has been separated from the slurry solids to be used for initial sludge dilution in the dredge hopper and for specific gravity adjustment in one or more make-up water injection stations within the slurry processing unit.

This invention also provides a method for controlling a slurry processing unit for pumping varying compositions of slurry through a floating delivery pipeline, with the unit having slurry piping connecting the output of an inlet slurry pump to the input of a discharge pump and with discharge piping connected between an outlet of the discharge pump and the floating delivery pipeline. The method includes the steps: pumping slurry through a floating pipeline to an on-shore treatment facility; separating solids from the slurry; supplying make-up water derived from the on-shore treatment facility through a floating return pipeline to a booster pump, injecting make-up water from the booster pump into the slurry processing unit through make-up water piping and supplying make-up water delivered by the return pipeline into the dredge hopper for initial dilution of the sludge.

BRIEF DESCRIPTION OF THE DRAWING

This invention can be best understood by reference to the following drawing figures in which:

FIG. 2 is a plan view of a slurry processing unit mounted on a barge;

FIG. 3 shows the barge-mounted slurry processing unit in elevation; and,

DETAILED DESCRIPTION OF THE INVENTION

Figure 1:
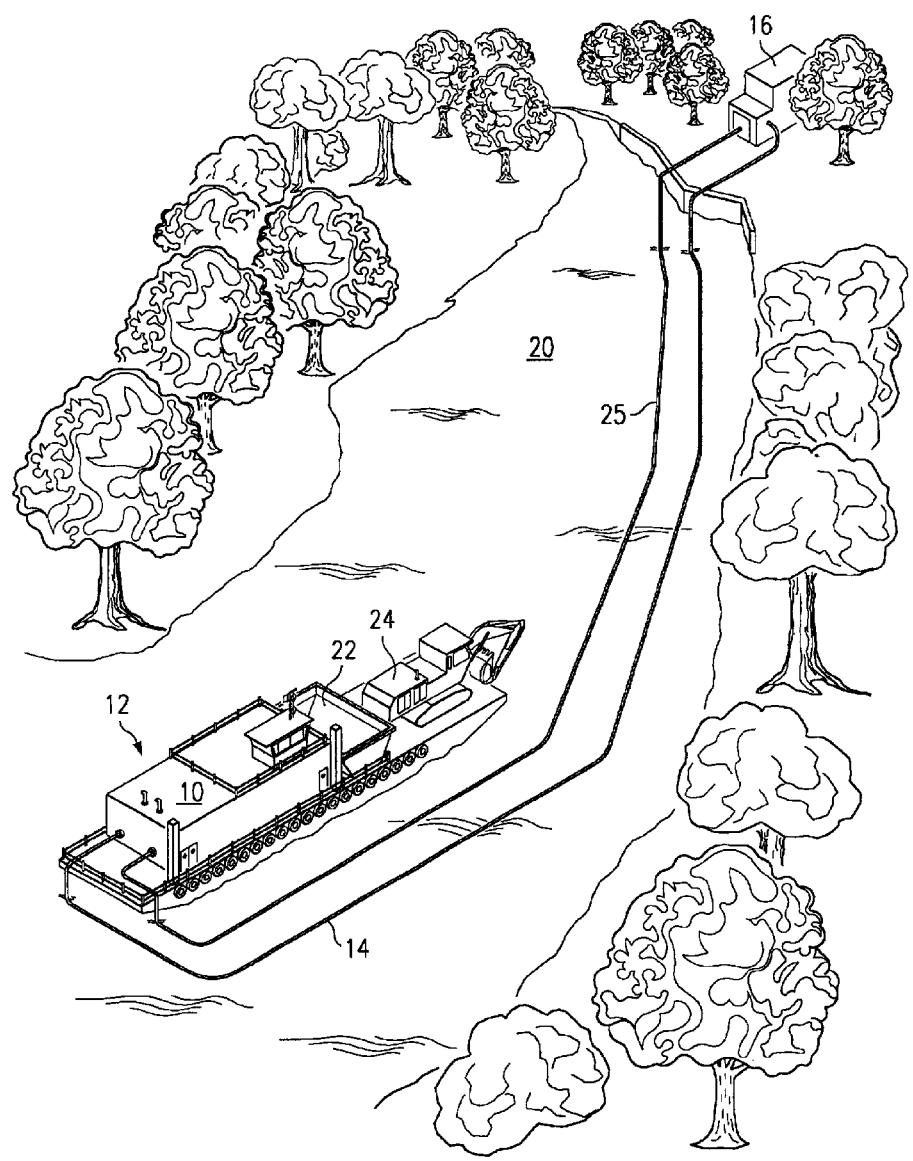
FIG. 1 shows a dredge, barge-mounted slurry processing unit, a floating delivery pipeline to an on-shore slurry separation/treatment facility, and a floating return pipeline for returning process treatment water to the slurry processing unit.

Referring now to FIG. 1–FIG. 4, a slurry processing unit 10 is mounted on a dredging barge 12 which transfers slurry through a floating delivery pipeline 14 to an on-shore treatment facility 16. Toxic sludge 18, for example creosote sludge, is dredged from the bottom of a river 20. The toxic sludge 18 is loaded into a sump or hopper 22 by means of a power loader 24. The hopper 22 is shown in FIG. 2 and FIG. 3. Make-up water is derived from process treatment water W pumped from the on-shore facility 16 via a floating supply pipeline 25 into the hopper 22 and is mixed with the raw dredge material to produce a pumpable, raw slurry.

Referring now to FIG. 2, the slurry processing unit 10 includes an inlet slurry pump 26 and slurry piping 28. Also shown is an inlet make-up water booster pump 30 and a slurry discharge pump 32. The discharge pump 32 is speed controlled. The slurry piping 28 connects the output 34 of the inlet slurry pump 26 to the input 36 of the discharge pump 32. In addition, discharge piping 38 connects between the outlet 40 of the discharge pump 32 and the floating delivery pipeline 14 (FIG. 1). Specific gravity sensor pairs 42, 44 and 46, 48 and 50, 52 are located at spaced locations along the slurry piping sections 28A, 28B and 28C, respectively. The sensor units of each pair provide analog signals that are combined to produce a specific gravity value that is characteristic of the slurry flowing through the slurry piping section extending between the sensor units of each sensor pair. Also shown are flow sensors 54, 56 and 58 connected between the slurry piping sections. FIG. 3 shows an elevation view of the pumping barge and the relationship between power loader 24 and the hopper 22.

Figure 4:
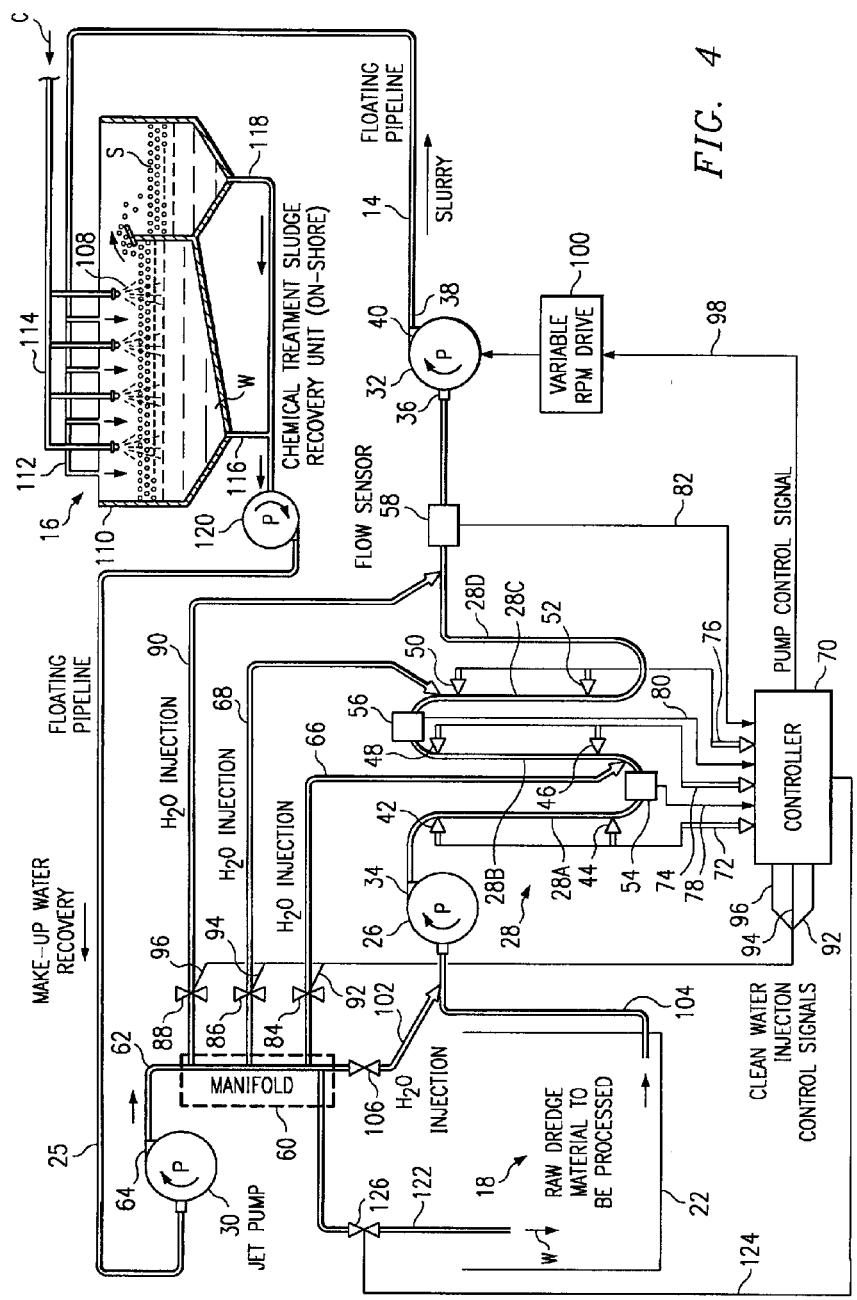
FIG. 4 shows a schematic slurry piping and process flow diagram.

FIG. 4 shows the injection of make-up water W into the slurry piping 28 between the adjoining piping sections 28A, 28B and 28B, 28C and the terminal section 28D. In particular, the make-up water piping has a manifold 60 with an inlet port 62 connected to the output 64 of the inlet make-up water pump 30 and has multiple make-up water outputs, including a first make-up water injection pipe 66 connected to the slurry piping section 28B between the second and third specific gravity sensors 44, 46, and a second make-up water injection pipe 68 connected to the slurry piping section 28C between the third and fourth specific gravity sensors 48, 50.

The first flow sensor 54 is connected in the slurry piping between the first piping section 28A and second piping section 28B, and between the second and third specific gravity sensors 44, 46. The second flow sensor 56 is connected in the slurry piping between the fourth specific gravity sensor 48 and the fifth specific gravity sensor 50. The third flow sensor 58 is connected in the terminal piping section 28D between the sixth specific gravity sensor 52 and the inlet port 36 of the slurry discharge pump 32.

A controller 70 receives analog specific gravity signals 72, 74, 76 from the specific gravity sensors 42, 44, 46, 48, 50 and 52, respectively and analog flow signals 78, 80 and 82 from the flow sensors 54, 56 and 58, respectively. A first controllable throttle valve 84 is connected in the first make-up water injection pipe 66. A second controllable throttle valve 86 is in the second make-up water injection pipe 68. An optional third controllable throttle valve 88 is connected in an optional third make-up water injection pipe 94, with the third injection pipe 90, if used, being connected to the terminal piping section 28D between specific gravity sensor 52 and the discharge pump 32.

The controller 70 receives signals from the specific gravity sensors and from the flow sensors and sends first, second and third throttle signals 92, 94 and 96 to the first, second and third controllable throttle valves 84, 86 and 88, respectively. The controller 70 also sends a speed control signal 98 to a variable rpm drive 100 to control the output of the discharge pump 32.

Initially, the combination of specific gravity sensor signals, flow sensor signals, and water injection provides rough specific gravity measurements. Then, after a first dilution and after a second dilution (each dilution with a known amount of make-up water), an accurate determination of appropriate total make-up water addition is made. It has further been found that by controlling the flow rate of the discharge pump 32, that the pressure in the slurry processing unit 10 can be controlled. Since the slurry is not compressible, this pressure control is important in the accurate determination of appropriate total make-up water addition to be made.

The specific gravity sensor pairs 42, 44; 46, 48; and 50, 52 include pressure sensors located at first and second elevations in the substantially vertical sections 28A, 28B and 28C of slurry piping. While the slurry processing unit preferably is constructed as described above, the make-up water piping may be operated without the controllable throttle valve and especially without the third controllable throttle valve 88 and the third make-up water injection pipe 90.

An auxiliary make-up water line 102 connected in the main slurry inlet conduit 104 can also be used to introduce make-up water into the hopper 22 for initial dilution, or can be used to aid in flushing the system, with shutoff valve 106 only opened during cleaning.

It will be understood that the slurry processing system 10 can be controlled using a variable speed drive 100 to control the pumping rate of the output pump 32. In particular, for example, the flow of the inlet slurry pump 26 can be controlled by throttling the make-up water injection and by speed controlling the discharge pump 32 even though the inlet slurry flow is not controlled or throttled.

Referring again to FIG. 1 and FIG. 4, the on-shore processing facility 16 is connected in a closed loop with the barge-mounted slurry processing unit 12 by the slurry delivery pipeline 14 and the make-up water return pipeline 25. Pressurized slurry 108 is sprayed into a containment vessel 110 through a delivery manifold 112. In the containment vessel, the sludge slurry is treated with chemical decontamination reagents C that are sprayed into the containment vessel through a spray nozzle assembly 114. Additional treatment reagent/additives or any other desired ingredients may also be added through the spray nozzle assembly.

In the containment vessel, the sludge solids S are skimmed off from the main compartment of the vessel into an adjoining collector compartment and are introduced for treatment in the next stage. The aqueous phase which includes the make-up water and the treatment chemicals, designated W, is separated and removed through drain lines 116, 118 and input into a low pressure pump 120 that has an output connected to the make-up water recovery pipeline 25. According to this arrangement, the make-up water is derived from the aqueous phase W after it has been separated from the chemically-treated sludge solids at the on-shore facility 16.

The aqueous phase W from which the make-up water is derived is transported via the buoyant pipeline 25 to the inlet of the booster pump 30, as shown in FIG. 4, where it is boosted to the pressure level necessary to accommodate the make-up water needs of the slurry processing unit 12. Some of the process water W is injected as make-up water through the injection piping 66, 68, 90 into the pressurized slurry flow stream at one or more specific gravity measurement stations on board the dredge as previously described. Some of the returned process water W is discharged directly into the dredge hopper 22 through a flow line 122 for initial dilution of the sludge. The amount of dilution flow is regulated by the controller 70 via a throttle signal 124 and throttle valve 126.

The closed loop recycling process described above has reduced the amount of clear make-up water added to the processing system by more than 50%. This has resulted in a substantial reduction in the overall cost of remediation by reducing the amount of treatment water that must be cleaned prior to its release from the contaminated dredging operation.

The invention is not to be construed as limited to the particular examples described herein, as these are to be regarded as illustrative rather than restrictive. The invention is intended to cover all embodiments that do not depart from the spirit and scope of the invention as defined by the appended claims.

What is claimed is:

1. A closed loop slurry processing system for pumping slurry from a slurry processing unit installed on a dredging barge to an on-shore treatment facility of the type including a containment vessel for receiving contaminated slurry, means for discharging a chemical decontamination reagent into the containment vessel for treating the slurry, and means for separating sludge from the slurry, thereby yielding process treatment water and treated sludge for disposal or further treatment, the closed loop slurry processing system comprising in combination:

a dredging barge;

a slurry processing unit installed on the dredging barge, the slurry processing unit including a hopper for collecting sludge dredged from a body of water, means for mixing make-up water with sludge in the hopper thereby producing an aqueous slurry, an inlet slurry pump having an inlet port coupled to the hopper for pumping slurry out of the hopper and having an outlet port, and slurry discharge piping coupled to the outlet port of the inlet slurry pump for discharging aqueous slurry into a delivery pipeline;

a slurry delivery pipeline connectable in flow communication with the slurry discharge piping for transporting slurry to an on-shore treatment facility for discharge into a containment vessel;

slurry pumping apparatus connectable in flow communication with the slurry delivery pipeline for pumping slurry from the slurry processing unit to the treatment facility for discharge into the containment vessel;

a return pipeline connectable in flow communication with the containment vessel for conveying process treatment water from the treatment facility to the dredging barge for discharge into the slurry processing unit;

make-up water pumping apparatus connectable in flow communication with the return pipeline for pumping process treatment water from the treatment facility to the dredging barge;

make-up water piping coupled to the make-up water pumping apparatus, the make-up water piping including injection piping for discharging process treatment water into the slurry discharge piping and said mixing means, said mixing means including a make-up water line for discharging process treatment water into the hopper; and controller means coupled to the injection piping and the make-up water line for controlling the discharging of process treatment water into the slurry discharge piping and the hopper.

2. A closed loop slurry processing system according to claim 1, the make-up water pumping apparatus including:

a low pressure pump having an inlet port coupled to the containment vessel for receiving process treatment water and having an outlet port coupled to the inlet of the return pipeline; and a make-up water booster pump having an inlet port coupled in flow communication with the outlet of the return pipeline and having an outlet port for supplying process treatment water to the hopper and slurry discharge piping.

3. Closed loop slurry processing apparatus comprising in combination:

an on-shore treatment facility including a containment vessel for receiving slurry, means for discharging a chemical decontamination reagent into the containment vessel for treating the slurry, and means for separating sludge from the slurry, thereby yielding process treatment water and treated sludge for disposal or further treatment;

a dredging barge including a dredge for removing contaminated sludge from a body of water;

a slurry processing unit installed on the barge for mixing make-up water with sludge thereby producing an aqueous slurry, the slurry processing unit including a hopper for collecting sludge dredged from a body of water and make-up water for mixing with the collected sludge;

a slurry delivery pipeline connectable in flow communication with the slurry processing unit for transporting slurry from the dredging barge to the treatment facility for discharge into a containment vessel;

slurry pumping apparatus connected in flow communication with the delivery pipeline for pumping slurry from the slurry processing unit to the on-shore treatment facility for discharge into the containment vessel;

a buoyant make-up water return pipeline for conveying make-up treatment water from the on-shore treatment facility across the body of water to the dredging barge;

make-up water pumping apparatus connected in flow communication with the return pipeline for pumping process treatment water from the treatment facility to the dredging barge to be used as make-up water in the hopper and for injection into a slurry discharge piping;

make-up water piping coupled to the make-up water pumping apparatus, the make-up water piping including injection piping for discharging process treatment water into the slurry discharge piping and a make-up water line for discharging process treatment water into the hopper;

controller means coupled to the injection piping and the make-up water line for controlling the discharging of process treatment water into the slurry discharge piping and the hopper; and piping means connecting the delivery pipeline, containment vessel, return pipeline, slurry discharge piping, slurry pumping apparatus and make-up water pumping apparatus in series flow, closed loop relation, whereby process treatment water can be used as make-up water in the slurry processing unit and returned to the containment vessel repeatedly without releasing process treatment water into the body of water while the sludge is being processed.

4. A closed loop slurry processing system for conveying an aqueous slurry containing contaminated sludge, removed from a body of water by a dredging barge, to an on-shore treatment facility for liquid-solids separation and chemical decontamination treatment, and after separation, conveying treatment water from the on-shore treatment facility to the dredging barge to be used as make-up water for mixing with collected sludge for producing an aqueous slurry and for adjustment of slurry specific gravity, said closed loop slurry processing system comprising, in combination:

a dredging barge including a dredge for removing contaminated sludge from a body of water;

a slurry processing unit disposed on the dredging barge, the slurry processing unit including a hopper for collecting contaminated sludge dredged from a body of water and means for mixing make-up water with collected sludge thereby producing an aqueous slurry, and having slurry discharge piping with an outlet for discharging aqueous slurry that can be pumped through a buoyant delivery pipeline;

a buoyant delivery pipeline connectable to the slurry processing unit for conveying slurry from the dredging barge across a body of water to an on-shore treatment facility for discharge into a slurry containment vessel for chemical treatment and liquid-solids separation;

slurry pumping apparatus connectable in flow communication with the delivery pipeline for pumping slurry from the slurry processing unit to the on-shore treatment facility for discharge into the containment vessel;

a buoyant return pipeline connectable to the containment vessel for supplying process treatment water produced by the on-shore treatment facility for discharge into the hopper for producing a slurry mixture of sludge and treatment water and for use as make-up water in the slurry processing unit for adjustment of slurry specific gravity;

slurry pumping apparatus connected in flow communication with the delivery pipeline for pumping slurry from the slurry processing unit to the on-shore treatment facility;

make-up water pumping apparatus connected in flow communication with the return pipeline for pumping process treatment water from the treatment facility to the slurry processing unit;

make-up water piping coupled to the make-up water pumping apparatus, the make-up water piping including injection piping for discharging process treatment water into the slurry discharge piping and said mixing means, said mixing means including a make-up water line for discharging process treatment water into the hopper; and controller means coupled to the injection piping and the make-up water line for controlling the discharging of process treatment water into the slurry discharge piping and the hopper;

whereby process treatment water produced by the on-shore treatment facility can be used and recycled for use as make-up water for mixing with contaminated sludge collected in the hopper thereby producing a slurry mixture of sludge and treatment water and for adjusting the specific gravity of the slurry in the sludge processing unit without releasing process treatment water or slurry into the body of water while the contaminated sludge is being processed, and thereby reducing the amount of treatment water processed by the on-shore treatment facility that must be treated to be made environmentally safe before land or waterway disposal.

* * * * *